Jan. 12, 1971  L. ZIELKE ET AL  3,554,653
AUTOCOLLIMATOR
Filed Jan. 24, 1968
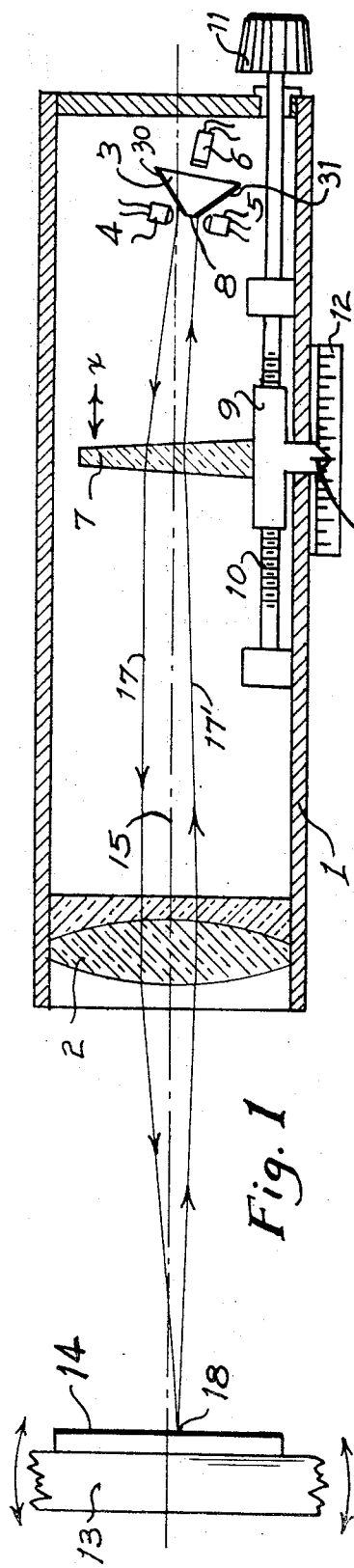
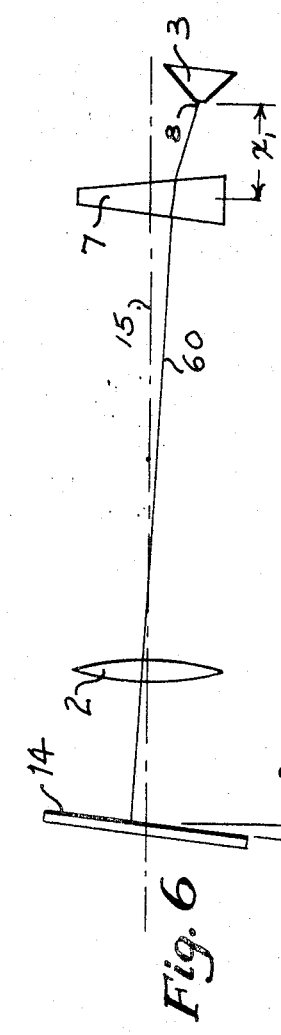
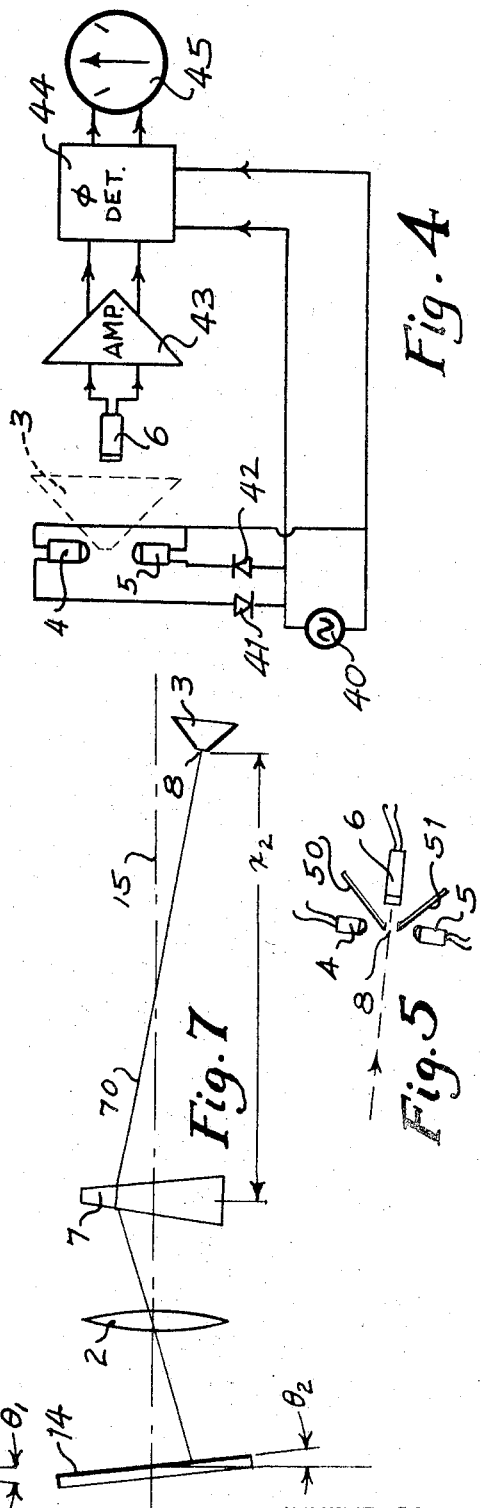
INVENTORS.
LAWRENCE ZIELKE
WILLIAM H. THURSTON
BY
Lawrence Fleming
AGENT.

United States Patent Office 3,554,653
Patented Jan. 12, 1971

3,554,653
AUTOCOLLIMATOR
Lawrence Zielke, 3681 Vista de Oro, and William H. Thurston, 4181 Farquhar Ave., both of Los Alamitos, Calif. 90720
Filed Jan. 24, 1968, Ser. No. 700,146
Int. Cl. G01b *11/26*
U.S. Cl. 356—153                                             9 Claims

ABSTRACT OF THE DISCLOSURE

An improved autocollimator employs a pair of modulated light sources and a pair of plane reflecting surfaces to direct the light out through an objective lens. Between the reflecting surfaces is a window or slit, and behind the slit a light sensor. The purpose of the autocollimator is to direct light onto an external reflector and measure sensitively the direction of the reflection. The reflected light reenters the objective and forms an image which may fall centered on the slit or may fall displaced with respect to the slit. The displacement of the image is a measure of the angular deviation of the returning light beam and is displayed on a zero-center indicator controlled by the light sensor through phase-sensitive circuitry.

The displacement may be measured more accurately by means of an optical wedge, movable in translation by a calibrated mechanism. The reflector and light-source assembly is mounted slightly off-axis and the beam is bent toward the slit by the wedge. Thus, small angular displacements of the returning beam are measured by setting the position of the optical wedge to re-zero the indicator reading.

---

This invention relates to autocollimators, which are telescope-like optical instruments for measuring very small angular displacements of a test object from a plane perpendicular to the line of sight. They are used, for example, in checking the flatness of machine beds and surface plates, and in measuring the drift rates of gyros. Resolutions of the order of 0.1 second of arc are attained. The basic principle of the autocollimator is that of observing the coincidence of an illuminated reticle or slit with its own image reflected from and external mirror, back through the instrument. The external mirror is mounted on the test object. When coincidence is observed, the external mirror is accurately perpendicular to the optical axis of the instrument. A general discussion of autocollimators is found in the book "Engineering Optics" by K. J. Habell and Arthur Cox, published by Pitman (London), 1948, page 218 et seq.

The present invention provides an autocollimator with a novel optical system in combination with sensitive photoelectric detection of the returned light. A null-indicating electronic system is provided, with novel means for imparting small known deviations to the beam with an optical wedge or weak prism movable in translation.

An object of the invention is to provide an autocollimator of superior sensitivity and precision, and of smaller physical size, relative to those known heretofore.

Another object is to provide an autocollimator of improved simplicity and ruggedness, and lower cost.

Other objects will appear hereinafter.

In the drawings:

FIG. 1 is a diagrammatic cross-sectional view of the optical and mechanical structure of a form of the invention;

FIG. 2 is a digrammatic end view of a portion of the optical system of FIG. 1 when the returning light beam is centered;

FIG. 3 is a view similar to FIG. 2 but with the beam deviated;

FIG. 4 is a block diagram of a form of the electronic system;

FIG. 5 is a diagrammatic view showing alternative form of a portion of the optical system;

FIGS. 6 and 7 are optical diagrams showing the operation of the movable wedge.

The same reference numerals are used to indicate corresponding elements in the various figures.

Referring to FIG. 1, the autocollimator of the invention may comprise a case or housing 1 having an objective lens 2. Alternative, a concave mirror (not illustrated) may be used instead of a lens. Light from two sources 4, 5 falls on reflective surfaces 30, 31 of a special prism or equivalent element 3, and is reflected therefrom toward objective 2. Between surfaces 30, 31 is a slit 8. The focal length and position of objective 2 are so chosen that it renders the light rays parallel. These rays impinge on an external mirror or reflecting prism 14 which is affixed to an external test object 13. Test object 13 may be a support adapted to be moved to different desired positions on a surface plate or machine bed under test, or for example a support attached to a gyro under test for drift. It may be positioned at any reasonable distance from the autocollimator because the light beam is parallel. The light from the autocollimator is reflected from mirror or prism 13 back into objective 2, which focuses it back to the source, i.e., the objective forms an image of the light sources back at the region where the light sources are located.

A weak prism or optical wedge 7 is located movably in the light path. Its operation will be described later.

Light sources 4, 5 are positioned so that a portion, e.g., half, of the luminous area of each is adjacent a reflective surface 30 or 31, as shown in FIG. 1. If the external mirror 14 is perpendicular to the optical axis 15, the light returned will form images of source 4 and source 5 that straddle the slit 8.

FIG. 2 is a simplified view illustrating this situation, showing the location of the images 4' and 5' of light sources 4 and 5 symmetrically about the window or slit 8. In this case, no part of either image occupies any of the slit area, and no light passes through the slit.

FIG. 3 is a similar simplified view illustrating the positions of the images 4', 5' when the external mirror 14 is not perpendicular to the optical axis 15. Here light from image 5' impinges on the slit 8 and passes therethrough, but no light from image 4'. If the angular deviation of external mirror 14 had been in the opposite direction, light from image 4' would pass through slit 8, but no light from image 5'.

The images, it will be noted, are on the opposite sides of the slit 8 from their respective light sources 4 and 5, because of the reversing effect of the optical system. In FIG. 1, a single ray 17 is indicated, originating from source 4, being reflected from surface 30, and passing through wedge 7 and objective 2, to external mirror 14. The resulting reflected ray, designated 17', passes back through the system and ends up at a corresponding point on the opposite mirror surface 31.

Referring still to FIG. 1, a light sensor 6 is positioned back of the slit or window 8, so as to receive light passing therethrough. It will be apparent that when the external mirror 14 is exactly perpendicular to optical axis 15, the sensor 6 will receive substantially no light stimulus from either image 4' or 5', but that when the external mirror is not precisely perpendicular, the sensor 6 will receive stimuli from one or the other of the images 4' or 5', depending on the direction or sense of the angular displacement of external mirror 14 from the true perpendicular. Electrical means for sensing and indicating the direction and magnitude of this angular displacement from a part of the invention, and are described later.

FIG. 5 shows an alternative form of the prism-like element 3, together with the light sources 4, 5 and light sensor 6. Here, the reflecting elements are relatively thin flat plates 50, 51, made of metal or other suitable material. The transparent or translucent slit or window 8 is a narrow space between the adjacent edges of these plates. The functioning of this modification is the same as that of the prism 3 of FIGS. 1–3. Advantageously the light sensor 6 may be mounted close behind the slit in the space between the plates 50, 51, as shown, to improve the light-gathering efficiency.

It will be seen that the window or slit 8 serves two purposes: it constitutes the interface or demarcation between the two light sources, and it acts as the reticle slit or window for the returning beam. The resulting simplicity of structure leads to superior dimensional stability and fewer adjustments compared with those prior art systems which employ separate slits, reticles, and beam spliters.

FIG. 4 is a block diagram of an electronic system according to the invention, forming a part of the autocollimator. A source of A-C electrical power 40 is connected to the light sources 4 and 5 so as to make them light alternately. This may be done, for example, by connecting rectifiers 41, 42, poled oppositely, in series with sources 4 and 5 as shown. When the returned images 4', 5' of the sources 5, 4, straddle the slit 8 (as shown in FIG. 2), the light sensor 6 will receive substantially no light and produce substantially no electrical signal. When the mirror 14 is non-perpendicular to the optical axis 15, the images 4', 5' will fall in a manner such as that illustrated in FIG. 3, and the sensor 6 will produce a pulsating electrical signal. For one direction of nonalignment or deviation, the signal will correspond to the pulsations of one of the sources, e.g., referring to FIG. 3, the sense of deviation has placed a portion of the image of source 5 over the slit, and the light sensor signal will pulsate in phase with the positive half cycles of the A-C source. For deviation in the opposite direction, the image of source 4 will be over the slit, and the light sensor output will correspond to the negative half-cycles of the A-C power. The signal from sensor 6 will thus contain magnitude and phase information which can be processed to indicate the magnitude and sense of the angular deviation of the external mirror 14 from true perpendicularity to the optical axis 15.

In FIG. 4, conventional amplifying means 43 and phase-sensitive detecting means 44 are shown to process the light sensor information so as to feed a zero-center electrical indicating instrument 45, which will display the direction and magnitude of the angular deviation. Indicating instrument 45 is preferably used as a null indicator, i.e., used in the region near its zero reading, which corresponds to the situation of FIG. 2, where the external mirror 14 is at true perpendicular to the optical axis 15, and substantially no light from the images 4' or 5' enters the slit 8—or if some small amount of light from the images does enter the slit due to aberrations or diffraction, it will enter in substantially equal amounts from each image, and not affect the zero or null reading of the indicator. At null, the gain of the amplifier and other circuitry, the brightness of the light sources, the sensitivity of sensor 6, the distance and size of mirror 14, and other related variables, do not affect the reading. The angular deviation is then measured by imparting an accurately known deviation to the light beam by precise mechanical and optical means, described below.

Any known means of modulating the light sources, as by mechanical shutters, may be used within the purview of the invention, as well as any means of detecting and processing the signal from the light received.

Referring now back to FIG. 1, a weak prism or optical wedge 7 is shown, which is arranged to deviate the light beam through small angles in a controllable calibrated manner, to permit angular measurements by the null method. It is known to provide small noncalibrated deviations by rotation or translation of an optical wedge, for example in making initial scale adjustments in optical range finders. However, as a means for measuring deviations, the rotation method suffers from having its range crowded into 90° of rotation, and from having a nonlinear (sine function) relation between the angle of rotation and the angle of beam deviation.

In the present invention, FIG. 1, these disadvantages are overcome by moving the wedge 7 in translation, substantially parallel to the axis of the instrument. In a Convergent beam, such as passes through the weak prism or wedge 7, the deviation produced by the wedge is $$y=(n-1)ax$$

where $y$ is the linear deviation of the image at the plane of focus, $a$ is the prism angle, $n$ is the refractive index of the prism material, and $x$ is the distance from the prism to the image plane. The relation is linear; hence it is possible to provide an accurate, simple, and rugged mechanism to traverse the wedge 7, and to read the deviation directly off a scale without using cams or other computing means.

A traverse or translation mechanism is shown semidiagrammatically in FIG. 1. Wedge 7 is mounted on a carriage 9 which is movable in translation (as indicated by arrow X), by means of a lead screw 10, which is rotatable by a knob 11. The deviation is read by means of graduations on knob 11 (not shown) and a pointer 16 and scale 12.

Alternatively, the translation and reading may be effected by means of a micrometer screw mechanism.

It will be apparent that optical wedge or weak prism 7 will always produce some deviation of the beam, whatever its position. Accordingly, the assembly comprising light sources 4 and 5, prism or like device 3, and light sensor 6 is mounted somewhat off the optical axis 15 of the objective 2, FIG. 1, in such a position that an axial beam will be focused on the slit or window 8 when the wedge 7 is at an intermediate position on its traverse, such as at mid-scale. Angular displacements of mirror 14 on test object 13 may thus be optically compensated in one sense or direction by moving wedge 7 to the right, and angular displacements in the other sense, to the left.

FIGS. 6 and 7 are optical diagrams illustrating the operation of the wedge 7 in measuring small angles of rotation of mirror 14, by the null method. The angles in the drawing are greatly exaggerated for the purpose of illustration; in the actual use of the autocollimator, the angles involved would typically be of the order of a few seconds to a few minutes of arc. In FIG. 6, mirror 14 on the test object (not shown) is inclined at a small angle $\theta_1$ to the normal to the optical axis 15. For clarity of illustration, only a single light ray 60 is shown, passing from the mirror 14 back through the autocollimator. In FIG. 6, the angle $\theta_1$ is such that less than normal wedge displacement is required to center the returned beam on the slit 8; accordingly, the distance $x_1$ from the wedge 7 to a slit 8 (the image plane) is relatively small. The correct position is, of course, indicated by a null reading on indicator 45 (FIG. 4).

In FIG. 7, the angular displacement $\theta_2$ of mirror 14 is in the opposite sense to $\theta_1$, so that a relatively large wedge displacement $x_2$ is required to center the images across slit 8, and obtain a null. The wedge 7 is accordingly moved away from slit 8 to new position $x_2$, as indicated by the path of ray 70.

We claim:

1. An autocollimator for measuring angles of deviation of an external planar reflector from perpendicularity to an optical axis, comprising a pair of inclined reflective surfaces having a relatively narrow light-transmitting space therebetween,
a pair of light sources positioned adjacent said surfaces to direct portions of their radiation onto an objective which provides said optical axis,
a light sensor positioned behind said space,
an optical wedge positioned on said axis between said objective and said space,
an calibrated means coupled to said wedge to position said wedge variably in linear translation along a path substantially parallel to said optical axis.

2. The structure of claim 1 wherein said pair of reflective surfaces is positioned off of said optical axis, whereby translation of said wedge is compensated for deviations of a reflected light beam in either direction with respect to said optical axis.

3. The structure of claim 1 wherein said pair of reflective surfaces are faces of a prism with reflective coatings, and said space is a light-transmitting portion of said prism between said surfaces.

4. The structure of claim 1 wherein said pair of reflective surfaces are on two thin reflectively-coated plates having a gap between their adjacent edges which constitutes said space.

5. An autocollimator according to claim 1 wherein said light sources are solid-state light-emitting diodes, and said light sensor is a solid-state device.

6. An autocollimator according to claim 1, wherein said light sources are energized alternately and said sensor feeds amplifying and phase sensitive circuitry to indicate the amplitude and direction of an angular deviation, 7. An autocollimator as in claim 2, further comprising: photoelectric null-detecting means providing a null signal when said translation of said wedge has compensated for off-axis deviation of said reflected beam.

8. An autocollimator as in claim 2, further comprising: a micrometer screw mechanically connected to said wedge to calibrate its position.

9. An autocollimator as in claim 2, wherein: reflected light from said external reflector is focused by said objective to form an image of each of said light sources in the vicinity of said narrow light-transmitting space,
the illumination provided on said light sensor from each of said images being substantially equal when translation of said wedge has compensated for off-axis deviation of said reflected beam.

References Cited

UNITED STATES PATENTS

| | | | |
|---|---|---|---|
| 3,241,430 | 3/1966 | Kulick | 356—150 |
| 3,277,304 | 10/1966 | Vyce | 356—150X |
| 3,359,849 | 12/1967 | Friedman | 356—153 |

RONALD L. WIBERT, Primary Examiner

P. K. GODWIN, Assistant Examiner

U.S. Cl. X.R.

250—216, 220; 356—123, 172